Patented Mar. 9, 1948

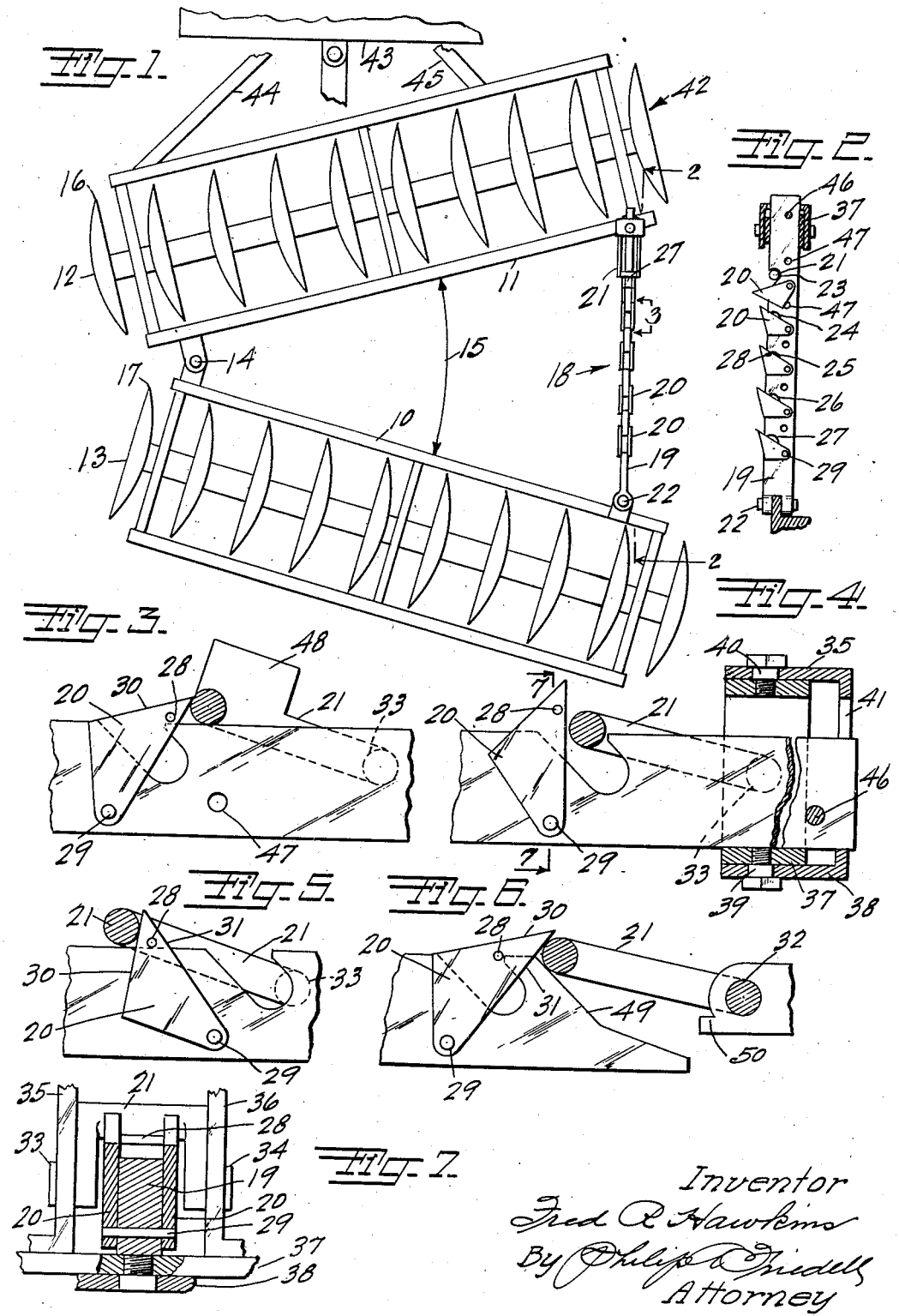

2,437,321

UNITED STATES PATENT OFFICE 2,437,321

AUTOMATIC COUPLING, DECOUPLING, AND ADJUSTING HITCH

Fred R. Hawkins, Waterford, Calif.

Application February 4, 1946, Serial No. 645,290

3 Claims. (Cl. 55—83)

This invention, an automatic coupling, decoupling, and adjusting hitch, is primarily designed for convenient and efficient operation of disk harrows in that, through its use the gangs can be adjusted to any desired angle simply through backing and advance movements of the tractive device such as a tractor. No manual controls, such as ropes, cables, fluid lines are required, because the coupling device is automatically coupled, decoupled and adjusted through simple forward and reverse movements. In turning in the direction of the pivotal connection between the gangs the gangs maintain their angular relation with the rear gang following the front gang in its adjusted angular relation, while in turning in the opposite direction the gangs will close to parallel with both gangs following the tractor and as soon as the tractor starts on a straight-away the gangs will open angularly to their maximum angular relationship. At any time the adjustment can be altered by first backing the tractor then moving forward slightly ahead of the desired adjustment and then backing slightly which sequentially decouples the engaging means or hitch, adjusts the hitch and then couples it in the adjusted position. Thus, the hitch is automatic in all respects even to that of automatically closing and opening for a turn away from the pivotal connection between the gangs.

Many different conditions may be encountered when disking a field, which may readily include high and relatively dry ground, low and wet to muddy, scrub, brush and stubble. When there is any appreciable variation in the soil such as passing from loam to clay or hardpan, or from moist to muddy, or from clear ground to stubble, brush or weeds, the angular relation of the gangs must be changed to suit the conditions or to clear the disks. With mud, brush or stubble, the disks may readily become clogged requiring paralleling of the gangs to clear the disks. With this invention, such adjustments and paralleling, are carried out as before explained, merely by slight backward and forward driving of the tractor.

The conventional disk harrow is adjusted, coupled and decoupled by means of some type of remote control which is manually operable, such as a cable, chain or rope, or by fluid means, and often the coupling means becomes fouled with mud or scrub so that it is necessary for the operator to climb out of the tractor, clean the coupling or control mechanism and then return to the tractor, manipulate the tractor and operate the control mechanism. With my invention the coupling means is self-cleaning and has no remote control means so that the operator has nothing to do except manipulate the tractor.

This device can also be used as an automatic coupling and decoupling arrangement for various types of transporting devices, such as between mechanical mules and dollies, trucks and the like for warehouse use; for skips around mine workings, and for other purposes where it is desirable to merely couple onto a vehicle, move it to some predetermined point, and then uncouple, with only backing and advance movements of the tractive device being required.

The objects and advantages of the invention are follows:

First, to provide an automatic coupling, decoupling and adjusting device for disk harrows and the like, and which is operative solely through relative movements of the coupling elements.

Second, to provide a device as outlined which can be uncoupled, coupled, or adjusted as to length of coupling through movement in opposite directions of one of the devices to be coupled.

Third, to provide a device as outlined which is positively operable and thereby self-cleaning through relative movements of the elements of the device.

Fourth, to provide a coupling between the respective gangs of a disk harrow by which the angular adjustment between the gangs can be altered at will by relative movement of the gangs.

Fifth, to provide a coupling as outlined which will maintain the gangs of a disk harrow in their adjusted angular relation to follow a traction means when turned in the direction of the pivotal connection between the gangs, and free the gangs for parallel operation when turned in the opposite direction and return the gangs to their angular relation when the traction means is again directed straight-away.

Sixth, to provide an automatic coupler and decoupler which is operative for coupling and uncoupling at will through relative movements of the coupling members.

In describing the invention reference will be made to the accompanying drawings in which:

Fig. 1 is a top plan view of a 2-gang disk harrow showing my invention applied thereto.

Fig. 2 is a side elevation of the invention, and corresponds to a section taken on line 2—2 of Fig. 1.

Fig. 3 is an enlarged fragmentary side elevation of the invention as viewed in the direction indicated by the double arrow 3, Fig. 1 showing the link in its backward movement and moving the guard back to permit the link to drop into the hook for coupling.

Fig. 4 shows the link ready to drop into the hook for coupling, and illustrates the pivotal connection for the link pivot.

Fig. 5 shows the link in its forward movement and moving the guard into obstructing relation to close the hook against admission of the link.

Fig. 6 shows a modification specifically designed as an automatic coupler and decoupler for coupling a vehicle to a tractive device.

Fig. 7 is a section taken on line 7—7 of Fig. 4.

The conventional multiple gang disk harrow consists of one or more pairs of gangs each of which has a frame 10 and 11 and a series of convexo-concave disks equally spaced with the disks 12 of one gang facing in a direction opposite to those 13 of the other gang, and with the disks staggered between the two gangs as is clearly illustrated.

These two gangs are pivoted together near one end as indicated at 14 though this pivotal connection may readily be at any point up to the center if the gangs are suitably spaced. The other ends of the gangs are connected together by some suitable adjusting means so that the angle 15 between the gangs can be changed to suit soil and surface conditions, and for mere transfer and cleaning or elimination of obstructions are adjustable to a parallel position.

When adjusted in parallel, the disks merely cut relatively shallow grooves in the soil, while when adjusted to full angularity the leading edges of the disks cut straight ahead as indicated at 16 and 17, with the underside of the disks gradually lifting the soil and the follow sides of the disks turning the soil out in opposite directions between the two gangs.

Most efficient breaking up of the soil occurs with maximum divergence of the gangs, but such operation is only suitable under certain soil and surface conditions. With variations in moisture, in the characteristics of the soil, in surface conditions, the degree of breaking desired, and mud, stubble or brush encountered, it becomes necessary to change the angularity at any time to suit the conditions, and in the case of brush or mud clogging, the gangs may have to be operated even in parallel. Furthermore, when the harrow is turned in a direction away from the pivotal connection between the gangs it is essential that the gangs return to parallel until straight-away travel is again in order, since if drawn about a curve away from the pivotal connection with the ganges angularly adjusted, the ground will be badly gouged and ridged.

To most efficiently and conveniently adjust the gangs at will the special automatic coupler, decoupler and adjuster 18 is used to connect the gangs and this device consists essentially of two engaging members one 19 of which is provided with movable guards 20 to prevent the companion engaging member 21 from engaging with the one member 19 when the members are moved in a separating direction, and to cause the companion engaging member to move the guards 20 to a position where it can engage when the members are relatively moved in a closing direction.

The member 19 though not so shown, can be formed to an arc with a center at the pivot 14, but such construction would require considerably heavier material to stand up under the tension between the lead and follow gangs, therefore the member 19 is pivoted to one gang as indicated at 22, and the other member 21 has a pivotal mounting to the other gang.

The engageable member 19 is provided with a series of spaced recesses 23 to 27 each of which is provided with a guard 20 the upper end of which extends above the bar 19 and which is provided with a stop 28 to limit movement in both directions about the pivotal mounting 29 and with the respective faces 30 and 31 being formed to an acute angle to form engaging faces and slideways.

The engaging member 21 in its simplest form, particularly when serving as a plain automatic coupling and decoupling device consists of a simple link with one end pivoted in an eye member as indicated at 32 in Fig. 6; however, for use in connection with a disk harrow the engageable and engaging members must be retained in suitable engaging positions and therefore require a suitable guiding arrangement, and this is illustrated in one form as consisting of the pivotal connection 22 for one end of the engageable member, and a combined pivotal mounting for the engaging member, and guide for the engageable member.

The engageable member is illustrated as consisting of a U-shaped member having the ends 33 and 34 of the legs bent outward at right angles to form pivots and with these pivots swingably operating in the uprights 35 and 36 and with the uprights fixed to a base 37 which is pivotally secured on a vertical axis to the frame 38 as indicated at 39 and 40 and with a suitable passage 41 being provided for the engageable member, so that, as the gangs are adjusted or moved to increase or decrease the angularity between them, the pivoted mounting will compensate for the angular movement of the engageable member and keep the engaging member always in engaging relation and position.

The operation of the invention is as follows:

The lead gang 42 is conventionally coupled to the tractor 43 through the adjustable draw rods 44 and 45.

The maximum angularity of the gangs is fixed by a stop member such as a bolt or pin 46 which is removably secured in one of the holes 47 which are equally spaced throughout the length of the member 19, so that the divergence between the gangs may be limited to any desired degree from parallel to maximum to be used. This stop member cooperates with the forward side of the brackets 35 and 36 at maximum divergence. If the soil conditions change or mud is encountered or if the disks become clogged with weeds, stubble or brush, or for any other reason it should prove desirable to close the gangs, the tractor is merely backed up, backing up the front gang 42 while the follow gang remains stationary. The link moves each guard back as indicated in Fig. 3 and drops into the successive engaging recesses sequentially as indicated in Fig. 4 and rides out of each one and over the guard so long as backing is continued, in each case cooperating with the face 31 of the guard and moving it back out of the way. If the tractor is stopped when the link falls into one recess as indicated in Fig. 4 and not backed farther, the adjustment is completed and the tractor can move forward immediately with the gangs in that adjusted position.

If the gangs are to be opened up, the tractor is backed up just enough to cause the link to ride out of the recess and over the top of the guard as indicated in Fig. 5. The tractor is then driven forward, the link pulling the guard forward to the position shown in Fig. 3 or 6 so that the recess is sealed against the link and when the link has moved far enough the tractor is stopped and then backed slightly just enough to move the guard out of the way and permit the link to drop into the recess.

Thus it is possible to carry out any degree or direction of adjustment between the gangs at any time without any control means other than forward and backing movements of the tractive means. Obviously the mechanism is self-cleaning since the link positively moves the guards to their respective positions and the link is made sufficiently heavy or suitably weighted as indicated at 48 to overcome the resistance of any mud or dirt which might restrict movement at the pivotal points 33 and 34.

If the tractor turns to the left viewing Fig. 1, the gangs will maintain their relative angularity and will follow the tractor around the curve, but if the tractor turns to the right the right hand end of gang 42 will slow up relative to the left hand end, the two gangs will be closed, with the link merely riding into the respective engaging recesses, out of them and over the guards, with the gangs following the tractor until the tractor is again directed on a straight course, at which time the right hand end of the lead gang will forge ahead, the link will pass over the guards, and the two gangs will be angularly separated to a degree as limited by the stop 46. If the angle is too great, as soon as the tractor completes its turn, it can be backed for the adjustment desired and then proceed on its course.

For plain coupling and decoupling, an incline 49 is formed on the end of the engageable member and a suitable stop 50 is provided for the link so that the link cannot fall below a cooperative position with the surface 49.

I claim:

1. Automatic coupling, decoupling and adjusting means for a gang disc harrow or the like comprising; a bar having a series of recesses formed from the top thereof and having one end connected to one gang of the harrow, and having a guard for each recess and movable to guarding and non-guarding positions; a link having connection to the other gang and having a cross-member engageable selectively in said recesses and cooperating with said guards sequentially for closing said recesses against entry of said cross-member when moved in one relative direction, and for opening said recesses sequentially for entry of the cross-member for coupling when moved in the other direction; said guards each comprising a member pivoted at the lower end to said bar and having a stop member for the upper end for cooperation with the top of the bar for two positions and with the guard projecting above the bar for cooperation with said cross-member, and forming a closure for the recess and a riding surface for the cross-member when in one position for decoupling.

2. Automatic coupling, decoupling, and adjusting means for gang-type harrows and the like comprising; a bar having one end pivotally connected to one gang and having a series of recesses formed from the top thereof defining engaging elements; a guard for each recess and pivotally mounted at its lower end to the lower portion of the bar and having the upper end projecting above the top of the bar and having angularly-related surfaces to function as actuating means and slideways, and having stop means for cooperation with the top of the bar, a link having a cross-member at one end for engagement in said engaging elements selectively and for cooperation with the guards to move the guards out of obstructive relation to the recesses sequentially for entry of the cross-member when moved in one relative direction from one side of the guard, and to move the guards into obstructive relation to the recesses sequentially to prevent entry of the cross-member and provide a slideway for the cross-member when the cross-member is moved in the other direction from the other side of the guards, and a pivotal mounting for the other end of said link and a pivotal connection between said pivotal mounting and the other gang; said pivotal mounting including guiding means for said bar to maintain alignment between said bar and said link.

3. A structure as defined in claim 2; and a removable stop member for said bar and cooperative with said pivotal mounting and adjustable selectively, at will, to a series of positions along said bar for limiting the maximum degree of angularity between the gangs.

FRED R. HAWKINS.

REFERENCES CITED

The following references are of record in the file of this patent:

UNITED STATES PATENTS

| Number | Name | Date |
|---|---|---|
| 308,602 | Fox et al. | Dec. 2, 1884 |